United States Patent [19]

Kinard et al.

[11] 4,283,818
[45] Aug. 18, 1981

[54] APPARATUS FOR REDUCING RACKET HANDLES

[75] Inventors: William C. Kinard, 3710 Alder La., Pasadena, Calif. 91107; Donald F. Carter, South Pasadena; Cecil G. Young, La Canada, both of Calif.

[73] Assignee: William C. Kinard, Pasadena, Calif.

[21] Appl. No.: 40,698

[22] Filed: May 21, 1979

[51] Int. Cl.³ .............................................. B23D 67/12
[52] U.S. Cl. .................................. 29/76 R; 51/59 R; 51/69; 144/2 R; 144/321
[58] Field of Search ................. 51/205 WG, 59 R, 60, 51/69; 29/76 R, 78, 76 A; 144/2 R, 162 R, 114 R, 115, 323, 321

[56] References Cited

U.S. PATENT DOCUMENTS

| | | | |
|---|---|---|---|
| 80,245 | 7/1868 | Ustick | 29/76 |
| 1,476,265 | 12/1923 | Matthews | 29/76 |
| 2,388,825 | 11/1945 | Burgeson | 29/76 |
| 3,518,735 | 7/1970 | Porter | 29/78 |

FOREIGN PATENT DOCUMENTS 453728  9/1936  United Kingdom .................. 51/69

Primary Examiner—W. D. Bray
Attorney, Agent, or Firm—Christie, Parker & Hale

[57] ABSTRACT

A hand operated apparatus for reducing the size of racket handles such as used in tennis rackets is described. A base in which racket handles are secured has raised opposed sides, the edges of the sides defining a guide plane. The guide plane is parallel to the center line of the handle secured within the base. A frame, having an adjustably extendable blade means, is adapted for slideable contact with the edges so that the blade means removes material from the racket handle in a plane parallel to the center line of the handle. A control means is provided for adjusting the depth of cut of the blade means. By repeated operation, uniform depth cuts can be made on each face of a racket handle to maintain symmetry.

19 Claims, 4 Drawing Figures

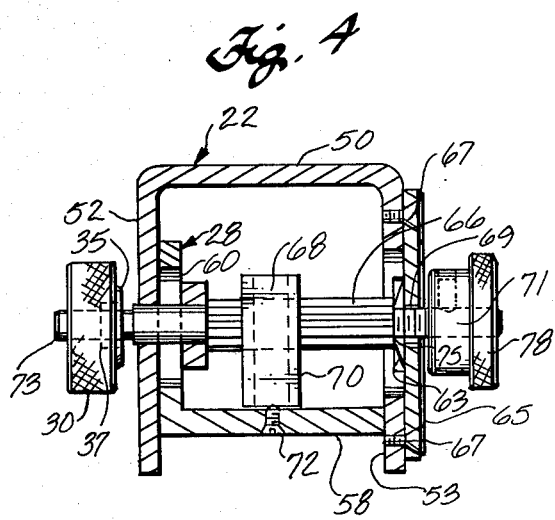

APPARATUS FOR REDUCING RACKET HANDLES

BACKGROUND OF THE INVENTION

1. Field of the Invention

This application relates to racket handle reducers, and more particularly, to a reducer that provides uniform removal of material from the handle in a plane parallel to the center line of the handle.

2. Description of the Prior Art

Often the need arises to reduce the hand gripping size of tennis rackets and the like. Normally, racket handles such as used in tennis rackets are wound with a thin leather strapping that covers a wooden handle. If the handle grip is too small for the user, the leather strapping is removed and replaced with thicker strapping thereby building up the racket handle hand gripping size to accommodate the user's hand.

For the case where the handle is larger than required, a thinner strapping proves inadequate, and material must be removed from the handle.

In order to reduce the circumference of the handle, the handle strapping is unwound, material is removed from the handle, and the strapping is rewound about the handle. Techniques for removing such material from racket handles are known in the prior art. One class of device is a hand-held wood rasp which is used in conjunction with a racket handle gripping device. Typically, the racket handle is tightly secured in a vise, and successive passes are made over the exposed side of the handle with a wood rasp. At such time that the desired amount of material is removed from the handle, the handle is released from the vise, rotated so that an adjacent side is exposed, and the rasp is then drawn over the exposed surface until the desired amount of material is removed.

The technique just described suffers from several inherent problems. Firstly, since the rasp is hand-held, difficulty is encountered in applying uniform cutting pressure along each side of the handle. Thus, more material may be removed from one portion of the handle than from another. Since the depth of cut is uncontrollable, a non-uniform handle structure may result. Such non-uniform handle structures give rise to non-uniform gripping of the handle by the user as well as creating a weight imbalance in the handle. Handle imbalance, especially when such handles are used in tennis rackets, adversely affects the accuracy of play of the user.

Secondly, alignment of the cutting plane of the rasp with the center line of the handle is very difficult to maintain. The final shape of the handle, after completion of the material removal process, often times is slightly pyramidal rather than rectangular, such pyramidal shapes adversely affecting the control of the handle and accuracy of play with such handle.

Thirdly, use of a hand-held rasp requires much care, attention and time in the material removal process to ensure that the proper depth of cut, as well as its alignment with the racket handle center line, occurs. The material removal process therefore becomes very time consuming resulting in a substantial service cost to the ultimate consumer.

Other techniques such as the use of sanding machines and the like require a substantial investment on the part of the user, and therefore make it commercially unfeasible to undertake such handle-reducing services.

The apparatus of the present invention has particular advantages over presently-used methods in that exact determinable amounts of the material may be removed from the racket handle. Thus, the maintaining of handle-shape symmetry on a reduced scale is readily achievable.

Additionally, the apparatus provides for a more automated method of reducing racket handles, thereby increasing the speed of the overall material removal process and lessening the amount of skill required to perform such process.

SUMMARY OF THE INVENTION

There is provided, according to a presently preferred embodiment, a hand-operated apparatus for removing material from a racket handle, the apparatus having a base that has a pair of raised opposed sides, the edges of which define a guide plane. Means are provided for securing a racket handle within the base with a center line of the racket handle being parallel to the guide plane. A frame straddles the raised opposed sides of the base, and is slideable upon the edges of said opposed sides. An adjustable blade means is secured to the frame for removal of material from the racket handle. The blade means is adjustably extendable between the frame and the racket handle for varying the depth of material removal from the racket handle, and the blade means is movable with the frame in a plane parallel to the guide plane.

BRIEF DESCRIPTION OF THE DRAWINGS

FIG. 4 is a transverse cross-section of the frame of FIG. 2.

DETAILED DESCRIPTION

Figure 1:
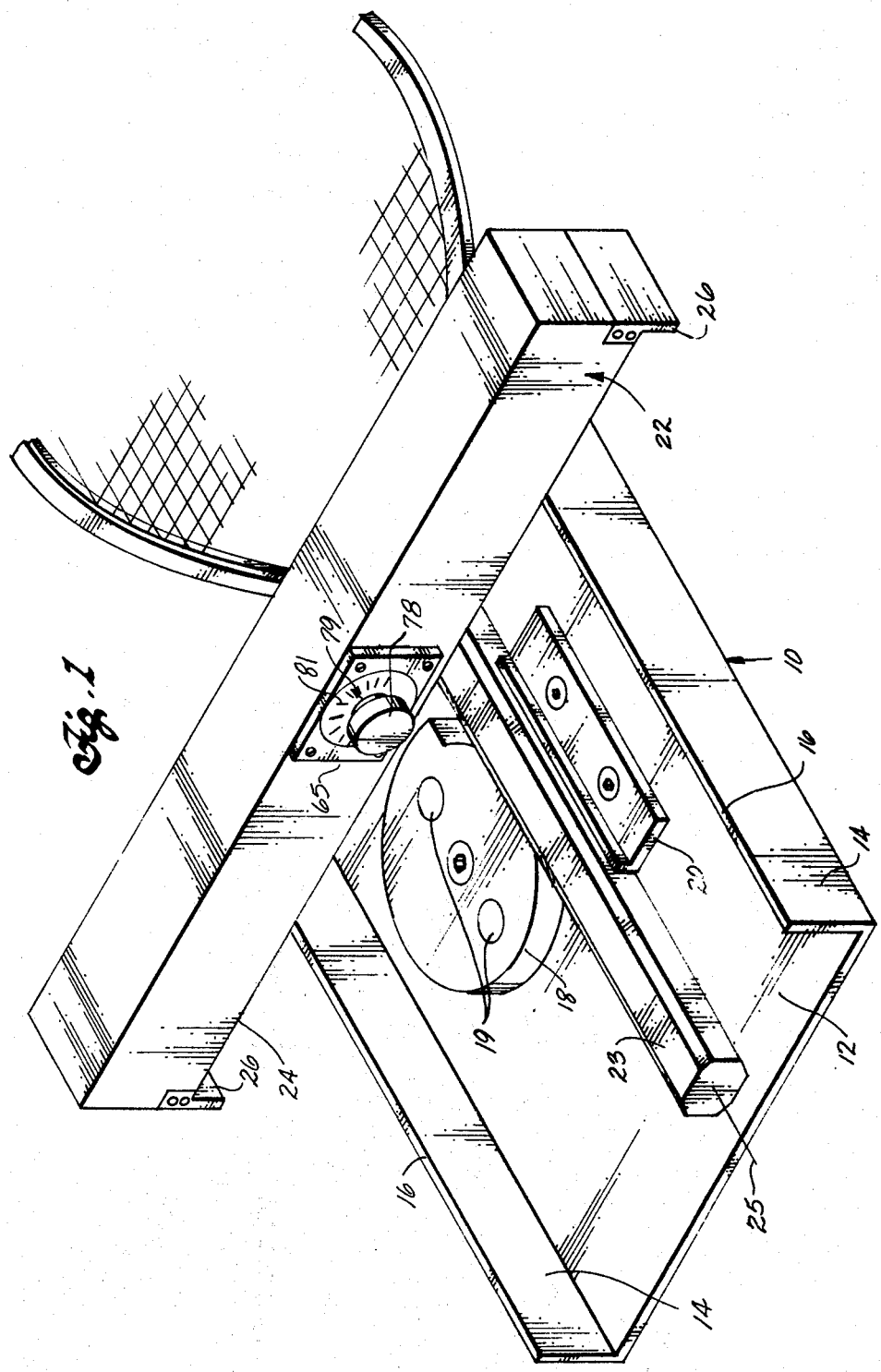
FIG. 1 is a perspective view of a racket handle reducer constructed in accordance with the present invention.

Referring to FIG. 1, there is shown a perspective view of a racket handle reducer constructed in accordance with the present invention.

The racket handle reducer 10 includes a flat base 12 having a pair of raised opposed side portions 14 that terminate at flat and parallel edges 16. The edges 16 are equidistant from the base 12, and define a guide plane parallel to said base. Rotatably mounted to the base is an eccentric cam 18 having torquer receiving holes 19. Secured to the base and located opposite to the eccentric cam is a brace 20. The brace serves to oppose the motion of the eccentric cam, such that a racket handle placed between the eccentric cam and the brace may be secured therebetween by means of a forced friction grip.

Placement of a racket handle 23 in surface contact with the base and locking said handle between the eccentric cam and brace serves to position the center line 25 of the handle parallel to the guide plane formed by the edges 16. The eccentric cam provides rapid securement of racket handles of differing sizes.

Slideably engaged with the side edges 16 is a frame 22. The frame has a length greater than the separation between the raised opposed sides and has parallel edges 24 that slide in contact with the edges of the base. Slideable engagement of the frame edges 24 with the base edges 16 on the base ensures that motion of the frame will be in a plane parallel to the guide plane. Located at each end of the frame are stop means 26. The stop means 26 serve to prevent the frame from sliding beyond the raised opposed side portions 14 and into the base.

Figure 2:
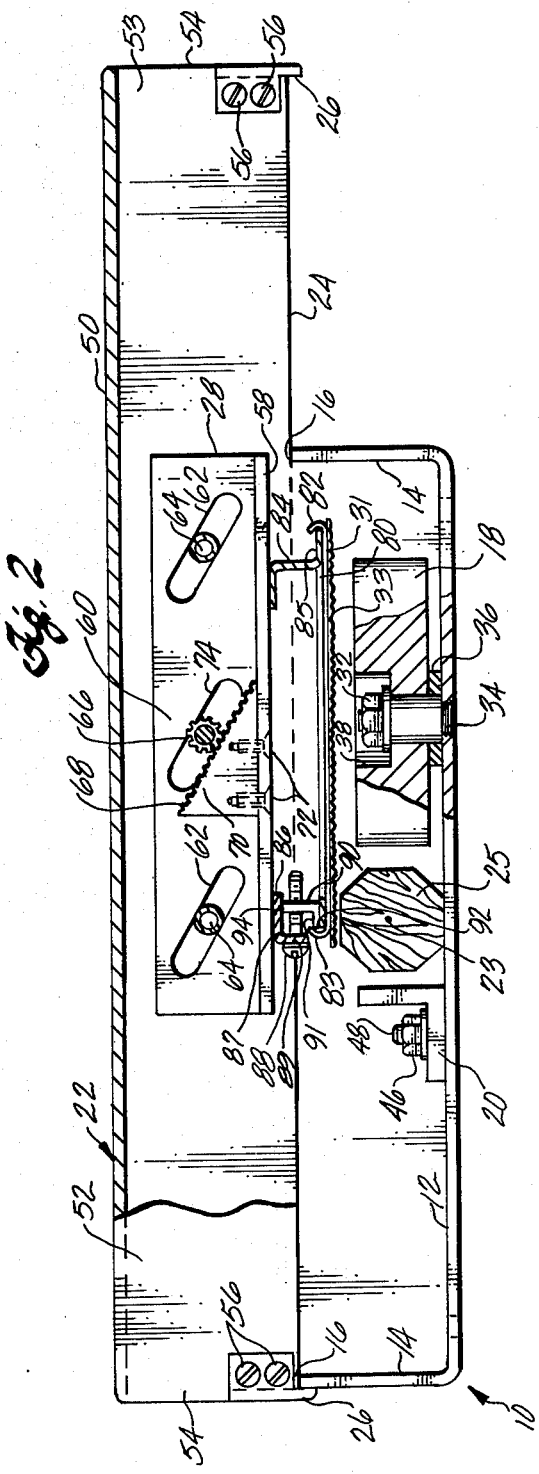
FIG. 2 is a partially cut away side view of the racket handle reducer of FIG. 1.
Figure 3:
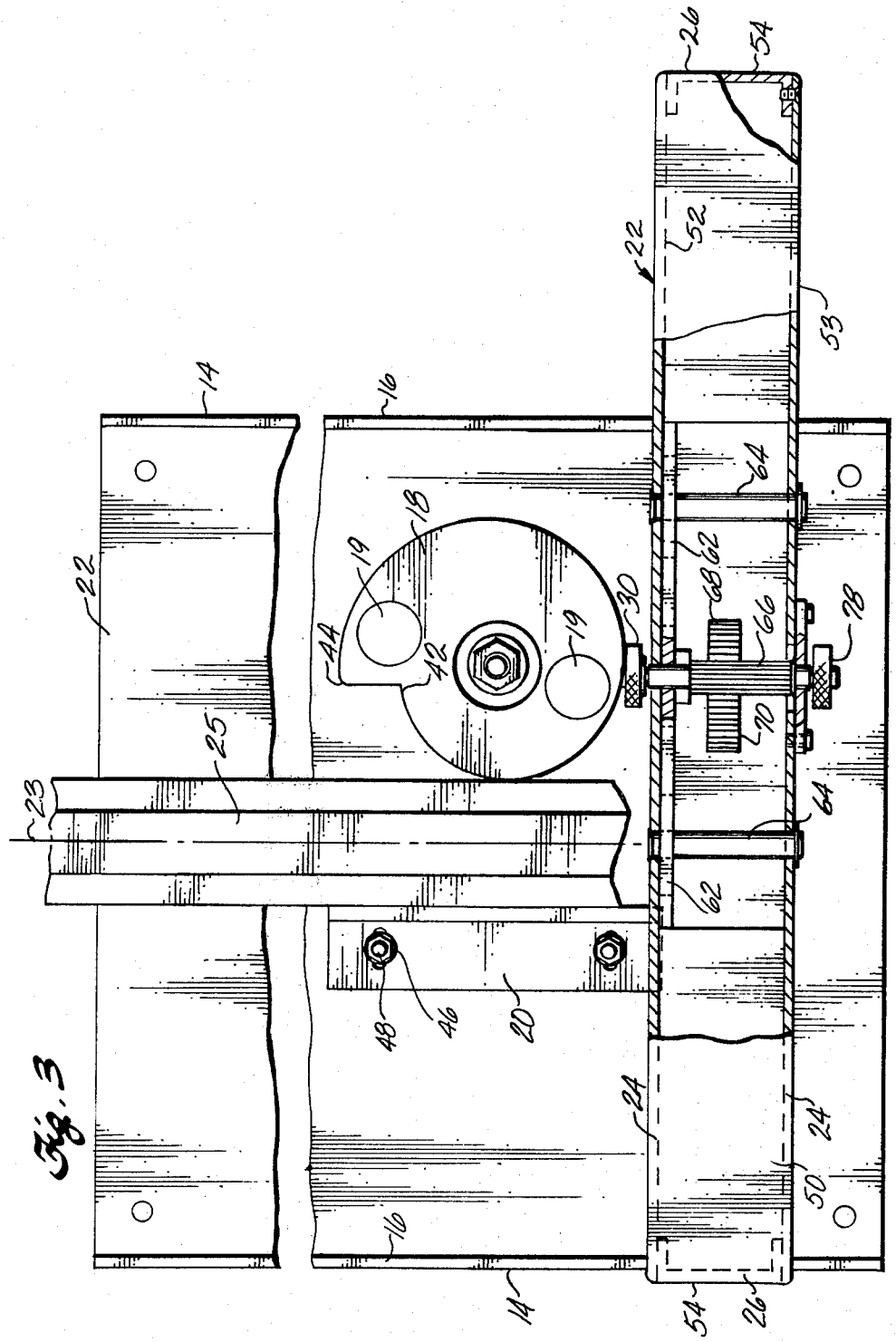
FIG. 3 is a partially cut away top view of the racket handle reducer of FIG. 1.

Adjustably mounted in the frame is the carriage 28 (see FIGS. 2, 3 and 4). The carriage is extendably adjustable from the frame 22 by use of rack and pinion means operatively coupled between the carriage 28 and the frame. Knob 78 controls the amount of extension of the carriage beyond the frame. Secured to the carriage 28 is the blade means 31.

In a typical operation, a racket handle that is to be reduced in size is placed in surface contact with the base 12 between the cam 18 and the brace 20. A suitable torquing device (like a spanner wrench) is inserted in torquer receiving holes 19. The torquing device is rotated to a point where friction force locking of a racket handle occurs between the cam and the brace. The frame 22 is then placed on the edges on the base, and the knob 78 is rotated until the blade means just contacts the handle. A desired depth of cut adjustment is then made, and the frame is oscillated across the handle surface to be reduced. Successive lowering of the carriage means by the knob is made until the amount of material removal from the handle reaches the desired amount. The length of the oscillatory motion of the frame 22 transverse to the handle is limited by the stop means 26 extending downwardly from frame ends 54. After completion of the material removal process on one side of the racket handle, the torquing device is reinserted in the torquer receiving holes, and the cam is rotated so as to release the racket handle secured between said cam and the brace. The process is repeated for each side of the handle until the desired amount of handle material is removed.

The base 12 is an essentially flat piece of rigid material, preferably steel or aluminum. Rotatably mounted in the base is an eccentric cam 18. The cam is rotatably secured to the base by means of locking engagement of the locking nut 32 and bolt 34. The bolt may be secured in the base by any one of a number of conventional fastening techniques. Separating the base and the eccentric cam is a spacing washer 36. The spacing washer serves to prevent contact of the cam with the base. The locking nut and the corresponding end of the bolt are located within the annular recess 38 of the eccentric cam. Location of both locking nut 32 and the corresponding end of bolt 34 within the recess 38 prevents contact of said nut and bolt with the blade means 31 passing thereabove.

The outer edge surface of the cam is defined by an involute surface generated by an increasing radius, the perimetral end of the radius rotating through an arc equal to 360°, starting at a point 42 on the edge surface and terminating at a point 44. Located at opposite sides of the center of rotation of the cam are torquer receiving holes 19 (see FIG. 3). Also secured to the base, by means of locking engagement of the nut 46 with the bolt 48, is the brace 20. The brace serves to oppose the action of cam 18 when gripping a handle therebetween.

Slideably mounted on the edges of the base is the frame 22. In the preferred embodiment, frame 22 is essentially U-shaped having a bight portion 50 and depending side portions 52 and 53. The side portions 52 and 53 have parallel edges 24 that are adapted for slideable contact with the edges 16 of the opposed sides 14 of the base 12. Thus, the slideable motion of the frame 22 is in a plane parallel with the guide plane defined by the edges 16.

Located at the ends 54 of the frame are stop means 26. The stop means is in the form of tabs extending downwardly beyond the edges 24 to prevent the frame from sliding beyond the edges 16 and into the base 12. The stop means 26 may be integral with the frame 22 or, as illustrated in FIG. 2, may be extension pieces secured to the frame by means of securing screws 56.

Located within the interior of the slideable frame is the carriage 28. The carriage comprises an L-shaped bracket having a base portion 58 and a depending side portion 60. The carriage is movable with respect to the frame 22 by means of slideable engagement between a pair of inclined slots 62 located in a side 60 of the carriage, and corresponding axles 64 located in the frame. The axles are parallel and secured at each of their ends to the depending sides 52 and 53 of the frame 22. The slots 62 are parallel to each other and inclined with respect to the carriage base 58. The alignment of the slots is such that a motion of the carriage along the axles has a component that is in a direction parallel to the guide plane, as well as a component that is in a direction perpendicular to the guide plane.

Control of the motion of the carriage along the axles is accomplished by means of engagement of a pinion shaft 66 and rack 68. The rack 68 is formed on the inclined surface of the wedge 70. The wedge is secured to the carriage base by means of locking screws 72.

The pinion shaft 66 is positioned within a slot 74 and secured between depending sides 52 and 53 of the frame. The guide slot 74 is located between and parallel to the guide slots 62. The slots 62 and 74, as well as the rack 68, are parallel and inclined at an angle, in the preferred embodiment, of about 30° relative to the bottom edges of the frame.

The central portion of the pinion shaft 66 has, around its perimeter, gear teeth that correspond in depth and pitch to the gear teeth of the rack so that rotation of the pinion shaft causes the rack and therefore the carriage connected thereto to move in a direction parallel to the incline. Thus, rotary motion of the pinion shaft 66 causes both a translation of the carriage 28 in a direction parallel to the guide plane and movement of the carriage in a direction perpendicular to the guide plane. For a specific rotation of the knob, the rack incline gives rise to a smaller movement of the blade means in a direction perpendicular to the guide plane than if the rack were oriented normal to the guide plane. Finer adjustment of the depth of cut of the blade means is obtained therefore with the rack inclined rather than perpendicular to the guide plane.

Shaft plane 65 is secured to depending side 53 by means of threaded screws 67. A bore 69 extends through the shaft plate, said bore being marginally larger than pinion shaft portion 71 passing therethrough.

Secured to pinion shaft portion 71 is the depth control knob 78. Rotation of the knob causes the pinion shaft to rotate, and thereby causing the movement of the carriage along the guide slots 62 and 74. A suitable pointer and indicator such as, for example, pointer 79 and indicator 81, may be attached to the knob and the frame, respectively. The indicator may be calibrated in appropriate units of length and therefore be used to indicate the amount of extension of the carriage from the frame thus giving an indication of the depth of cut off blade means 31.

Secured to the pinion shaft portion 73 is locking knob 30. The locking knob is threaded to match screw threads on the corresponding end of the pinion shaft. Rotation of the locking knob causes, upon its contact with the frame, a friction gripping between the pinion shaft and the frame for preventing any relative motion between the carriage and the frame. Raised annular boss 35 on locking knob 30 provides a contact surface between the locking knob and depending side 52 when the carriage is locked in place. The bore 37, in the locking knob, provides clearance for the pinion shaft when the locking knob is rotated for locking the carriage in place.

Mounted on pinion shaft portion 71 and located between and in abutting relationship with shaft plate 65 and pinion shaft edge 75 is annular spring washer 63. The spring washer maintains a force between the carriage 28 and pinion shaft 66 such that the carriage is held in stable contact with depending side 52 when locking knob 30 is loosened and control knob 78 is rotated.

The blade means 31 includes a cutting surface 33 that is mounted to a supporting bar 80. The supporting bar has a reverse bend 82 at one end, and a reverse bend 83 at its other end. Suspended from base portion 58 is angle bracket 90 and Z bracket 84. The Z bracket 84 has an extension arm 85, and the angle bracket has an extension arm 91. The Z bracket may be secured to the base portion by any of a number of fastening techniques such as welding. The angle bracket is threaded and receives tightening bolt 88.

A side 87 of an L-shaped carriage bracket 86 is secured to the carriage base portion 58. The depending side 89 of the carriage bracket has a bore slightly larger than the shank diameter of the tightening bolt. The depending side of the carriage bracket is located between the head of the tightening bolt and the angle bracket mounted on the tightening bolt. The extension arms 85 and 91 engage the supporting bar reverse bends 82 and 83, respectively, such that tightening of the bolt 88 spreads the Z bracket and angle bracket apart, and the blade means suspended therebetween becomes rigidly mounted to the carriage.

The blade means may be any of a number of material-removing surfaces such as, for example, a plurality of knife edges, sandpaper or a wood rasp.

While the basic principle of this invention has been herein illustrated along with one embodiment, it will be appreciated by those skilled in the art that variations in the disclosed arrangement both as to its details and as to the organization of such details may be made without departing from the spirit and scope thereof. For example, the means for adjustably extending the blade means between the frame and the racket handle may be formed of vertical guide means rods secured to the frame and passing through corresponding mating openings in the carriage. A hand operated-vertical threaded screw, coupled to the carriage and engaging mating screw threads in the frame, may be used to adjust the height of the carriage and thus the blade means above the racket handle.

Accordingly, it is intended that the foregoing disclosure and the showings made in the drawings will be considered only as illustrative of the principles of the invention and not construed in a limiting sense.

What is claimed is:

1. An apparatus for removing material from a racket handle comprising:
   a base portion having at least one pair of raised opposed sides, the sides having edges that define a guide plane;
   means for securing a racket handle within the base, a center line of the racket handle being parallel to the guide plane;
   a frame slideable upon the edges of said raised sides, said frame having a length greater than the separation between the raised opposed sides of the base portion;
   blade means secured to the frame and movable with the frame in a plane parallel to the guide plane for removing material from the racket handle; and
   means for adjustably extending the blade means between the frame and the racket handle for varying the depth of material removal from the racket handle.

2. The apparatus according to claim 1 wherein the means for securing the racket handle within the base includes a rotatable eccentric cam and a brace for opposing the action of the cam.

3. The apparatus according to claim 1 wherein the frame has the general shape of a U-shaped channel having a bight portion and depending side portions, the side portions having parallel edges, said edges adapted for slideable contact with the edges of the raised sides of the base portion.

4. The apparatus according to claim 3 wherein the frame includes stop means for limiting the amount of travel of the frame in a direction transverse to the raised sides of the base portion.

5. The apparatus according to claim 3 wherein the blade means further comprises:
   a carriage mounted in the frame;
   a blade secured to the carriage; and
   means for adjusting the amount of extension of the carriage from the frame.

6. The apparatus according to claim 5 wherein the means for adjusting the amount of extension of the carriage from the frame includes:
   guide means for guiding the carriage at least in a direction perpendicular to the edges of the frame; and
   means for positioning the carriage along the guide means.

7. The apparatus according to claim 6 further including means for locking said carriage in the adjusted position.

8. The apparatus according to claim 6 wherein the guide means includes:
   a plurality of spaced apart rods extending between the depending side portions of the frame; and
   a plurality of slots located in the carriage, one of such slots mating with each of such rods, each of such slots similarly inclined with respect to the edges of the depending side portions.

9. The apparatus according to claim 8 wherein the means for positioning the carriage along the guide means includes:
   rack and pinion means, the rack means secured to the carriage parallel to the slots;
   pinion means for engaging said rack means; and
   means for rotating said pinion means for translating the carriage in a direction parallel to said slots.

10. The apparatus according to claim 5 wherein the blade is a wood rasp.

11. An apparatus for removing material from racket handles comprising:
a base;
means for defining a guide plane that extends above the base;
means for securing a racket handle within the base comprising rotatable eccentric cam means and a brace means, the cam means and a brace means coupled to the base, the brace means for opposing the action of the cam means when securing a racket handle therebetween such that a center line of the racket is parallel to the guide plane;
movable frame means operatively coupled to the means for defining a guide plane for moving the frame means parallel to the guide plane;
blade means operatively coupled to the frame means for removing material from the racket handle in a plane parallel to the guide plane; and
means for adjusting the depth of the material removal by the blade means.

12. The apparatus of claim 11 wherein the means for defining the guide plane includes a pair of raised opposed base extension portions having edges that define said guide plane.

13. The apparatus of claim 11 or 12 wherein the frame means includes means for engaging the means defining the guide plane such that motion of the frame means is parallel to the guide plane.

14. The apparatus of claim 11 wherein the means for adjusting the depth of material removal by the blade means includes:
carriage means operatively coupled to the frame means so that the carriage means is extendable with respect to the frame means, the blade means being secured to said carriage means; and
means for adjusting the amount of extension of the carriage means with respect to the frame means.

15. The apparatus of claim 14 wherein the means for adjusting the amount of extension of the carriage means from the frame means includes:
guide means for guiding the carriage means in a direction at least in a direction perpendicular to the guide plane;
means for positioning the carriage means along the guide means; and
means for locking the carriage means in the extended position.

16. The apparatus of claim 15 wherein the guide means is inclined relative to the guide plane.

17. An apparatus for removing material from a handle comprising:
a base;
means for defining a guide plane that extends above the base;
means for securing a handle within the base;
movable frame means operatively coupled to the means for defining a guide plane for moving the frame parallel to the guide plane;
blade means operatively coupled to the frame means for removing material from the handle in a plane parallel to the guide plane; and
means, on the blade means, for adjusting the depth of the material removal by the blade means.

18. The apparatus of claim 17 wherein the means for adjusting the depth of material removal by the blade means includes:
carriage means operatively coupled to the frame means so that the carriage means is extendable with respect to the frame means, the blade means being secured to said carriage means; and
means for adjusting the amount of extension of the carriage means with respect to the frame means.

19. The apparatus of claim 18 wherein the means for adjusting the amount of extension of the carriage means from the frame means includes:
guide means for guiding the carriage means in a direction at least in a direction perpendicular to the guide plane;
means for positioning the carriage means along the guide means; and
means for locking the carriage means in the extended position.

* * * * *